June 30, 1964 H. COLE 3,139,044
DUSTING EQUIPMENT
Filed Jan. 18, 1962 5 Sheets-Sheet 1

INVENTOR.
HERBERT COLE
BY
Dean, Fairbank & Hirsch
ATTORNEYS

June 30, 1964    H. COLE    3,139,044
DUSTING EQUIPMENT

Filed Jan. 18, 1962    5 Sheets-Sheet 2

INVENTOR.
HERBERT COLE

BY
Dean, Fairbank & Hirsch
ATTORNEYS

June 30, 1964  H. COLE  3,139,044
DUSTING EQUIPMENT

Filed Jan. 18, 1962  5 Sheets-Sheet 4

INVENTOR.
HERBERT COLE
BY
Dean, Fairbank & Hirsch
ATTORNEYS

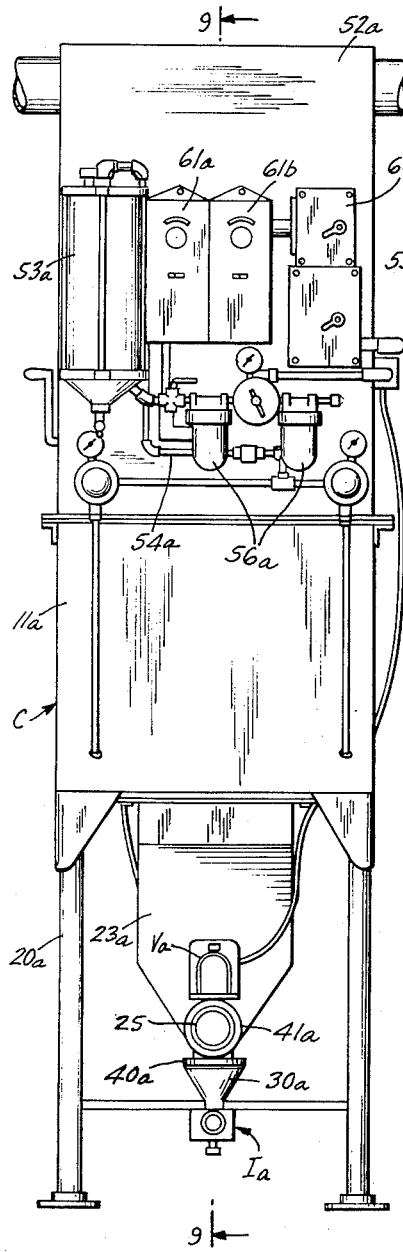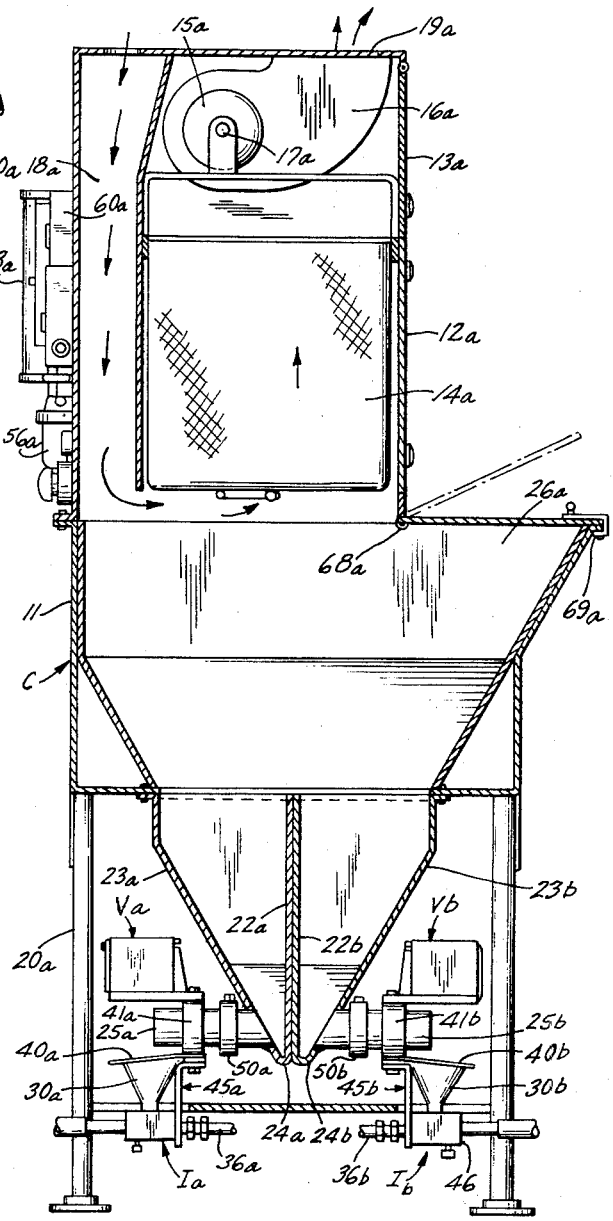

United States Patent Office 3,139,044
Patented June 30, 1964

3,139,044
DUSTING EQUIPMENT
Herbert Cole, New York, N.Y., assignor to Herbert Cole Trust, composed of William Walter Frankel, Charles William Britcher, and Herbert Cole, trustees, New York, N.Y.
Filed Jan. 18, 1962, Ser. No. 167,047
3 Claims. (Cl. 107—7)

The present invention is concerned with dusting equipment and while it has an important application in the bread, pie and biscuit baking industry, it has a much wider application to dusting operations employed in various industries where the applicaton of dry powder of any kind with individual particle separation is required or desired, as for instance in the application of talc, starch, sugar, flour, clay, stearate, mica or resin for the purpose of preventing sticking, picking or blocking, that may occur in such industries as rubber, coated fabrics, plastics, chewing gum and confectionery and in the manufacture of laminates among other applications.

It is among the objects of the inventon to provide dusting equipment, especially where the powder used is very fine, as for instance fine starch powder which, when poured, readily spreads into and floats in the atmosphere and remains therein, to the annoyance and possible health hazard of personnel, and more particularly equipment that will substantially completely eliminate flotation into the ambient atmosphere and settling on the walls, floor and ceiling, of fine dust in handling, especially in the loading or filling of the powder supply hopper, and in the re-transfer of recovered powder for effective re-use.

According to the invention, from one important aspect, the excess powder delivered to the dusting chamber is drawn by suction for recirculation by return to the collector and thence delivery to the powder hopper for re-use. The suction is also effective in refilling the hopper, so that no powder flotation occurs in the filling operation, which heretofore has presented the difficulties above pointed out.

Figure 1:
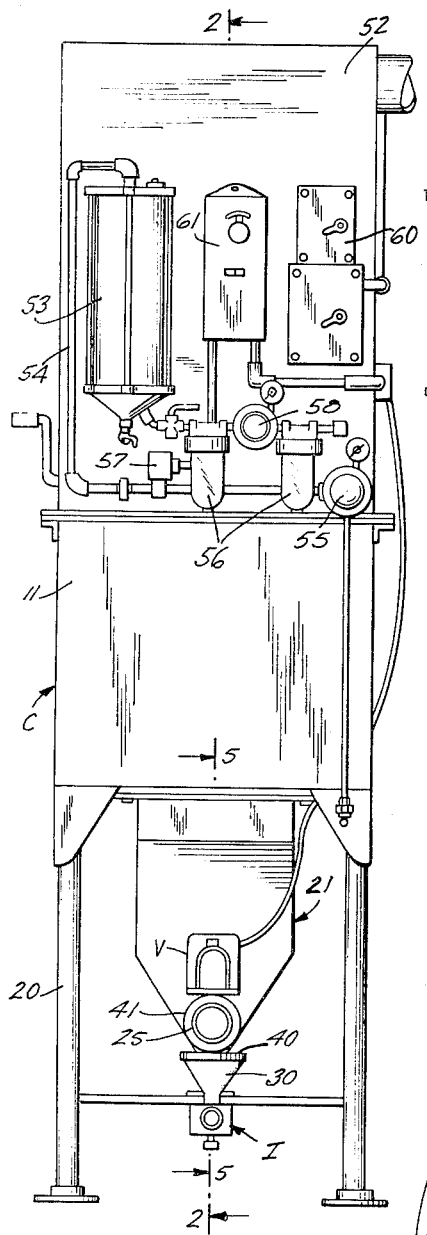
Figure 2:
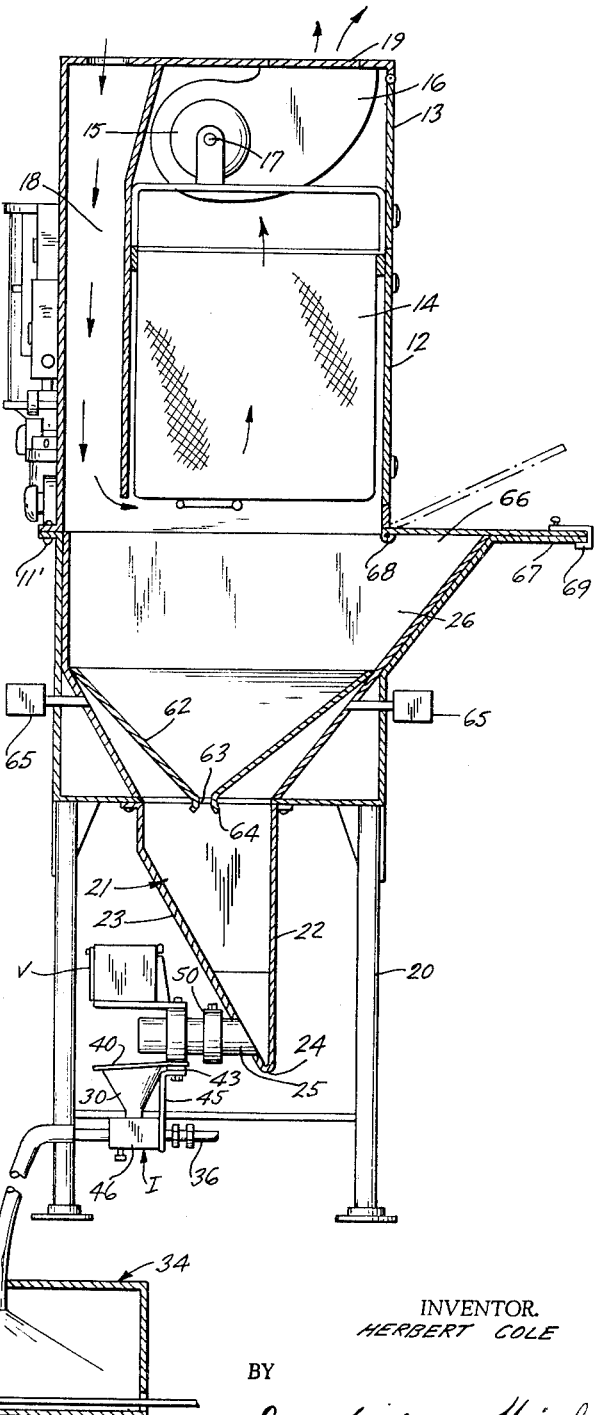
Figure 3:
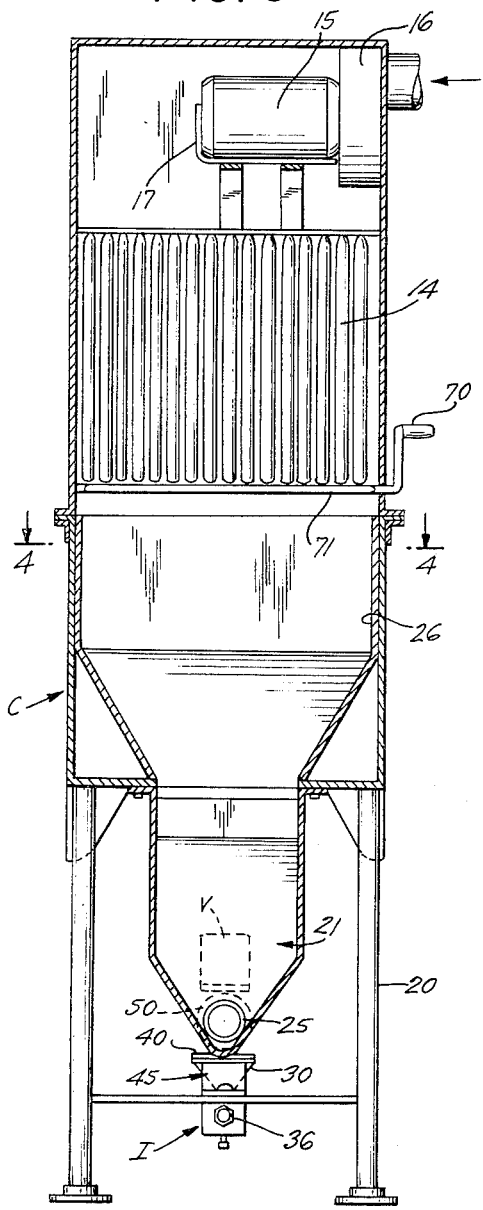
Figure 4:
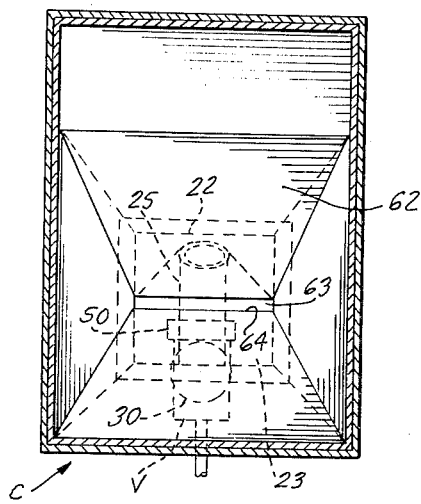
Figure 5:
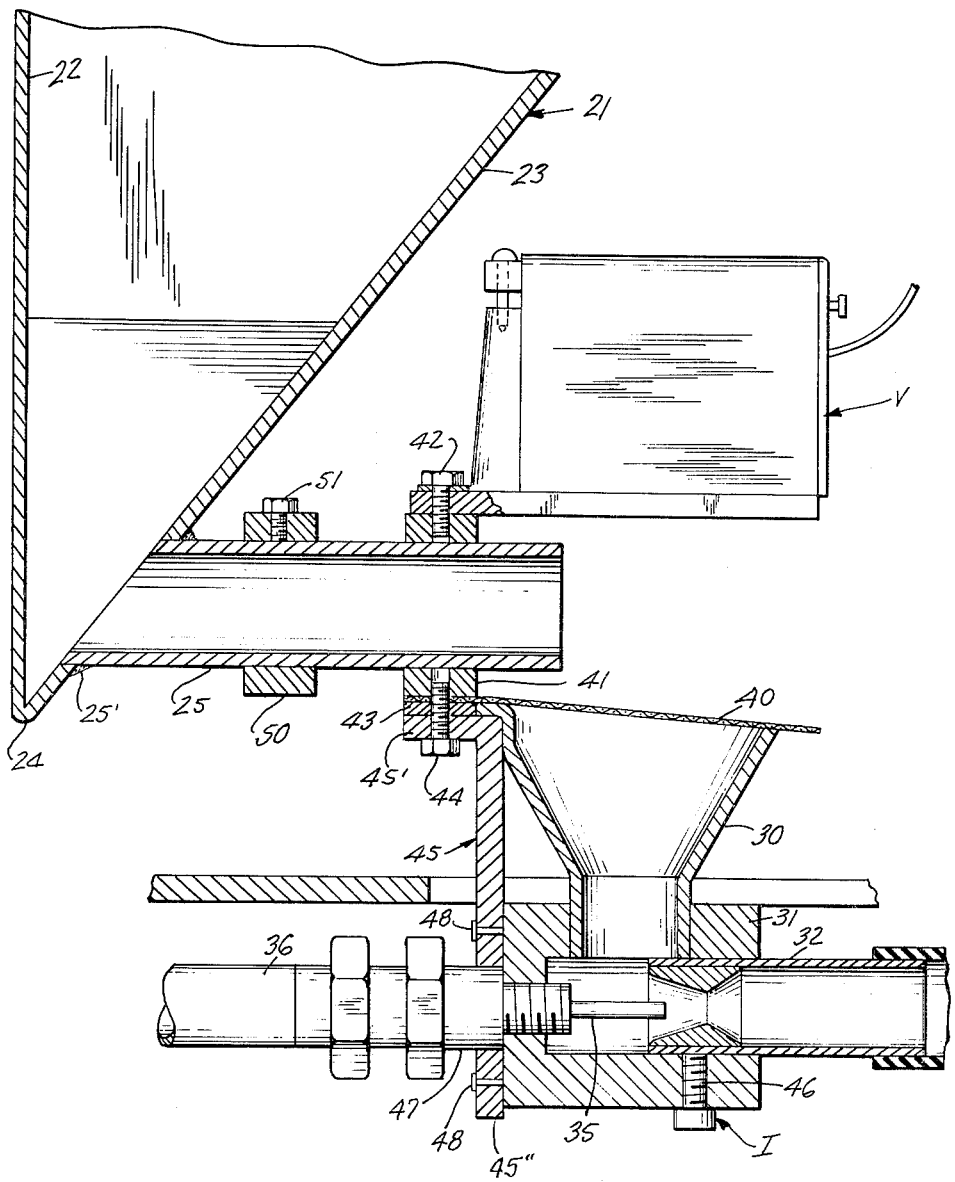
Figure 6:
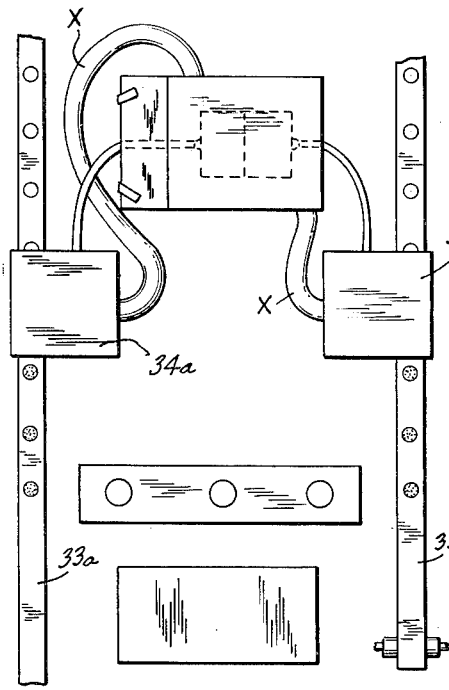
Figure 7:
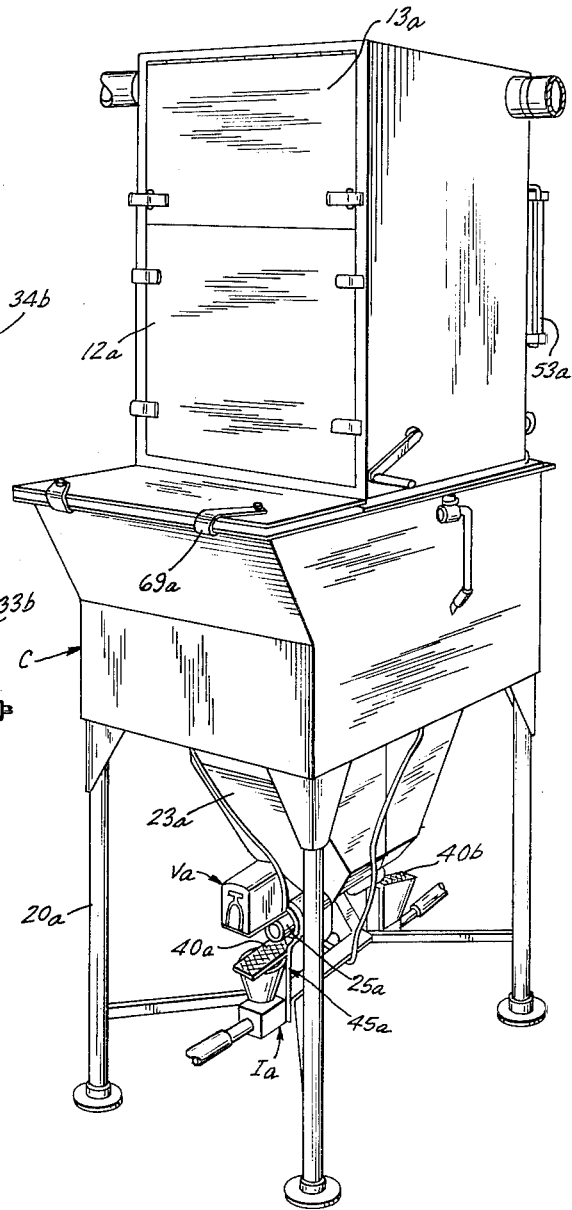

In the accompanying drawings in which are shown one or more of various possible embodiments of the several features of the invention, FIG. 1 is a front view of one embodiment of equipment for the purpose, FIG. 2 is a longitudinal sectional view of FIG. 1 taken on line 2—2 of FIG. 1, FIG. 3 is a rear view thereof, FIG. 4 is a transverse sectional view taken on line 4—4 of FIG. 3, FIG. 5 is an enlarged sectional view taken on the line 5—5 of FIG. 1 of the lower portion of equipment as shown in FIG. 2, FIG. 6 is a diagrammatic view showing the invention applied to a dual feed system as for instance for dusting the conveyors and chambers for starch dusting dough conveyors for the lower crust and the upper crust of pie, FIG. 7 is a perspective view from the rear of powder supply and control equipment for the embodiment of FIG. 6, FIG. 8 is a view similar to FIG. 1 showing the dual equipment from the front, and FIG. 9 is a view similar to FIG. 2 showing a side view of the dual equipment.

Referring now to the embodiment of FIGS. 1 to 5, the equipment comprises a rectangular steel case C having three compartments 11, 12 and 13 in superposed relation.

As shown, one compartment is a supply hopper 11 for the powder, which hopper has mounted thereon, desirably bolted thereto, as at 11' a filter chamber 12 in which are accommodated a multiplicity of filter bags 14 which constitute part of the powder collector. The upper portion of the powder collector constitutes a casing 13 having an electric motor 15 and a suction fan 16 therein, driven thereby, desirably on a common shaft 17 and exerting its suction through the duct 18 in the casings 12 and 13 beyond the filters 14 to pass upward through the filters and exhaust at 19 through the top of the casing 13.

The casing unit described is preferably mounted upon four legs 20 rigid therewith, to afford space therebetween for the lower reduced discharge portion 21 of the supply hopper. That reduced lower discharge portion 21 desirably has a rear wall 22 which is vertical and an oblique opposed front wall 23 of sheet steel, desirably of a single blank reversely bent at the lower edge 24 common to the lower ends of the vertical wall 22 and the oblique wall 23.

Desirably, a horizontal rigid powder outlet tube 25 is welded to the oblique wall 23 as at 25'. The discharge of powder from that tube is fed to a funnel 30 below the outlet of said tube, which funnel has its lower reduced end mounted (as in FIG. 5) in the holder casing 31 of the dispersion injector I, through which the powder dispersed in air is driven through the Venturi 32 to the dusting chamber 34 shown diagramatically in FIG. 5, by way of jet 35 (FIG. 5), said chamber having a conveyor belt 33 passing therethrough. Compressed air is delivered through tubing 36 through the air injection jet 35 feeding into the Venturi to draw the powder into the Venturi where it is dispersed after passage from the funnel through the dispersion injector.

A screen, preferably a metal screen 40 overlies the mouth of the funnel 30 and rests at its far end upon the forward portion of the rim of the funnel.

To assure reliable feed of the powder through the powder discharge tube 25 and adequate vibration of the screen for assuring comminution of the powder particles, to enter the funnel and thence the dispersion injector, a collar 41 of steel much thicker and more rigid than the powder discharge tube 25 encompasses the tube immediately to the rear of the outlet of the powder discharge tube and has mounted thereon as by screw 42 an electrically driven vibrator V of any suitable design. The screen 40 is soldered or welded to a steel plate 43 which is attached to the lower part of the collar 41 by a screw 44 which also attaches the collar 41 to the outlet tube 25. The screen slopes downwardly and rests freely on the rim of the funnel. The outlet tube 25 being of thinner stock does not have the rigidity imparted to it by the encompassing collar 41, which is desirably of 3/16 inch stock of steel and 1/4 inch or more in width.

Effectively to transmit vibration from the vibrator V to the dispersion injector I, in order to assure delivery from the funnel 30 to the Venturi 32, an angle bar or bracket 45 of steel is clamped at its short angle end 45' against the collar 41 by the lower screw 44 and the long arm 45" of the bracket extends downward desirably against the intake end of the dispersion injector casing 46. To this end the bracket arm has an aperture 47 to accommodate the compressed air tube 36 and is securely attached to the inlet end of the casing 46 by screws 48.

For enhanced rigidity of the outlet tube 25, a second collar 50, similar to collar 45, encompasses the tube and is secured thereto by a screw 51. The stiffness effected by the two collars 41 and 50 imparts such rigidity to the tube 25 that the vibration from the vibrator V is effectively transmitted through the tube 25.

The front panel 52 of the powder collector and filter chamber mounts the control equipment, including the dehydrator 53 for the air admitted by way of tube 54 through the low pressure regulator 55 and thence by way of air filters 56, the flow being controlled by a solenoid operated air valve 57. A high pressure regulator 58 is used to control the supply pressure in the factory which is usually much higher. On the panel there is desirably also mounted the vibrator control switch 60, the switch for controlling the motor which controls the powder return to collector 13 and there is also a rheostat 61 which controls the vibrator V.

Within the supply hopper 26 is a baffle 62 which is generally pyramidal in shape and is welded in place at its upper rim and extends downward from its widest to its narrowest end practically the height of the upper or main volume of the supply hopper. This baffle desirably has a slot 63, preferably extending the width of the lower section of the supply hopper, and is desirably in the range of two inches wide, and having a lip 64 at each edge thereof, extending downward for about two inches out of contact with the rest of the structure. These lips permit vibration and permit powder feed.

Above the slot 63 there are in the side wall of the dust collector two or more check valves 65 normally open to admit air at atmospheric pressure. When the powder level drops below the level of the slot 63 at the lower end of the baffle, vacuum from the top of the collector closes the valves so that no effective feed is possible until the supply hopper has been replenished with powder.

The supply hopper 26 extends laterally beyond the powder collector chamber at 66 by the oblique relation of its wall and suitable closure means, as for instance cover 67 hinged to the wall of the powder collector chamber at 68 and latched closed as at 69 may be opened to replenish the hopper with starch or other powdered material required, while at the same time the fan 16 is driven from its motor 15 to exert suction which will keep the powder being poured into the supply hopper from mushrooming or floating into the air and when the supply hopper has been filled the cover 67 is again closed.

The filter carrying portion of the powder collector has a handle 70 at its outer wall, connected to a shaker bar 71 to raise and lower the filter bags 14 so that the powder adhering thereto is shaken therefrom.

The embodiment of FIGS. 6 to 9 is generally similar to that of FIGS. 1 to 5 except that it accommodates a dual outlet arrangement, suitable for instance for simultaneously dusting through separate controls in two separate dusting chambers 34a and 34b as would for instance be desirable in dusting the conveyors for dough for the bottom crust and the top crust of pies.

In the embodiment of FIGS. 6 to 9 the same reference numerals are used for the respective powder feeders with exponents "a" and "b" respectively. Desirably, the vertical walls 22ª and 22ᵇ of the supply hopper outlet portions in the embodiment of FIGS. 6 to 9 are in face to face engagement with each other, substantially midway between the carrying legs 20ª.

It will be noted, in the application for pie baking for instance, there are two dusting chambers 34ª and 34ᵇ in parallel relation through which pass conveyor belts 33ª and 33ᵇ respectively, which chambers are supplied respectively through suitable powder conduits, the excess powder being drawn from chambers 34ª, 34ᵇ to the dust collector 13ª through heavier conduits X under suction of the fan 16ª.

As many changes could be made in the above equipment, and many apparently widely different embodiments of this invention, could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A dusting equipment comprising a power supply hopper, a hopper collector thereabove, a filter chamber intervening between the powder collector and the powder supply hopper, an outlet tube near the bottom of the powder supply hopper and protruding outwardly therefrom, a metal ring considerably heavier than the outlet tube and clamped about the same and a second, like metal ring clamped about said powder outlet tube, a funnel below said outlet tube having a mouth inclined downwardly and outwardly below the outlet tube, said funnel being secured at its rim to said first ring, a screen over the mouth of said funnel, a dispersion injector below the funnel and supplied therefrom, a source of compressed air connected thereto, a dusting chamber connected to the discharge end of the dispersion injector and encompassing the surface area to be dusted, a powder outlet from the dusting chamber, a conduit connected therefrom and delivering into said powder collector, an electric motor, and a fan driven thereby, both in said powder collector, for propelling the collected powder to pass upward through said filter, means for venting air from said filter chamber, and an electric vibrator rigidly connected to said first metal ring and rigidly connected in vibrating transmitting relation to said screen.

2. The combination recited in claim 1 in which the screen protrudes at its free portion slightly beyond the funnel for shedding any agglomerated powder that does not pass through the screen.

3. A dusting equipment comprising a powder supply hopper, a hopper collector thereabove, a filter chamber intervening between the powder collector and the powder supply hopper, an outlet tube near the bottom of the powder supply hopper and protruding outwardly therefrom, a funnel below said outlet tube, a screen over the mouth of said funnel, said funnel being rigidly affixed at one rim part with respect to said outlet tube, a dispersion injector below the funnel and its supply therefrom, a source of compressed air connected thereto, a dusting chamber connected to the discharge end of the dispersion injector encompassing the surface area to be dusted, a powder outlet from the dusting chamber, a conduit connected therefrom and delivering into said powder collector, an electric motor, and a fan driven thereby, both in said powder collector, for propelling the collected powder to pass upward to said filter, said powder supply hopper having a filling opening laterally of the filter chamber for replenishing the same with powder, the suction of the fan applied to the hopper through the filter chamber preventing the flotation of powder into the room in the filling operation, means for venting air from said filter chamber, and an electric vibrator rigidly connected to said outlet tube from the supply hopper and rigidly connected in vibrating transmitting relation to said screen.

References Cited in the file of this patent

UNITED STATES PATENTS

| | | |
|---|---|---|
| 1,859,304 | Lipsius | May 24, 1932 |
| 2,869,482 | Britcher | Jan. 20, 1959 |
| 2,963,994 | Britcher | Dec. 13, 1960 |
| 2,982,410 | Barr et al. | May 2, 1961 |